US010442331B2

(12) United States Patent
Inoue et al.

(10) Patent No.: US 10,442,331 B2
(45) Date of Patent: Oct. 15, 2019

(54) VEHICLE SEAT

(71) Applicant: TOYOTA BOSHOKU KABUSHIKI KAISHA, Aichi-ken (JP)

(72) Inventors: Takuya Inoue, Aichi-ken (JP); Kazunobu Nuno, Toyama-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/983,686

(22) Filed: May 18, 2018

(65) Prior Publication Data
US 2018/0339620 A1 Nov. 29, 2018

(30) Foreign Application Priority Data

May 26, 2017 (JP) ................................. 2017-104968

(51) Int. Cl.
*B60N 2/68* (2006.01)
*B60N 2/64* (2006.01)
*B60N 2/30* (2006.01)

(52) U.S. Cl.
CPC .............. *B60N 2/68* (2013.01); *B60N 2/646* (2013.01); *B60N 2/682* (2013.01); *B60N 2/3009* (2013.01)

(58) Field of Classification Search
CPC ........... B60N 2/68; B60N 2/682; B60N 2/646
USPC ....................................... 297/452.15, 452.18
See application file for complete search history.

(56) References Cited

U.S. PATENT DOCUMENTS

| | | | | |
|---|---|---|---|---|
| 4,850,644 A * | 7/1989 | Kazaoka | .............. | B60N 2/0715 297/452.18 |
| 5,029,942 A * | 7/1991 | Rink | ...................... | B60N 2/686 297/452.18 |
| 5,100,204 A * | 3/1992 | Makihara | ................ | B29C 49/20 264/516 |
| 5,219,202 A * | 6/1993 | Rink | ..................... | B60N 2/4214 297/216.13 |
| 5,240,310 A * | 8/1993 | Rink | ...................... | B60N 2/686 297/452.18 X |
| 5,490,718 A * | 2/1996 | Akizuki | ................. | B60N 2/507 297/452.18 |
| 5,509,716 A * | 4/1996 | Kolena | ................ | B60N 2/4228 297/452.18 X |
| 5,713,611 A * | 2/1998 | Kurimoto | .............. | B21D 39/06 285/222 |

(Continued)

FOREIGN PATENT DOCUMENTS

JP 2015-003645 1/2015

*Primary Examiner* — Rodney B White
(74) *Attorney, Agent, or Firm* — Greenblum & Bernstein, P.L.C.

(57) ABSTRACT

A vehicle seat includes a side frame, a cushion panel, and an insertion member. One of the side frame and the cushion panel is provided with an elastically deformed portion including an outer circumferential surface and an inner circumferential surface, the outer circumferential surface being configured to be expanded outward by insertion of the insertion member on the inner side of the inner circumferential surface. The other of the side frame and the cushion panel is provided with a recess forming portion facing the outer circumferential surface of the elastically deformed portion, the recess forming portion having an inner surface configured to be brought into pressure contact with the outer circumferential surface expanded by insertion of the insertion member.

9 Claims, 7 Drawing Sheets

(56) References Cited

U.S. PATENT DOCUMENTS

| | | | | |
|---|---|---|---|---|
| 6,421,979 B1* | 7/2002 | Fischer | ................... | B29C 65/56 |
| | | | | 403/363 |
| 6,523,893 B2* | 2/2003 | Kamper | ............... | B60N 2/4228 |
| | | | | 297/216.13 |
| 7,503,627 B2* | 3/2009 | Kawasaki | ............... | A47C 7/029 |
| | | | | 297/452.18 X |
| 8,408,654 B2* | 4/2013 | Jones | ................... | B60N 2/1803 |
| | | | | 297/452.18 X |
| 8,690,255 B2* | 4/2014 | Yamaki | ............... | B60N 2/4228 |
| | | | | 297/452.18 X |
| 8,936,312 B2* | 1/2015 | Evans | ................... | B60N 2/4228 |
| | | | | 297/452.18 X |
| 8,955,906 B2* | 2/2015 | Evans | ................... | B60N 2/4228 |
| | | | | 297/452.18 X |
| 9,090,190 B2* | 7/2015 | Yasui | ...................... | B60N 2/68 |
| 9,168,855 B2* | 10/2015 | Evans | ...................... | B60N 2/68 |
| 9,434,281 B2* | 9/2016 | Evans | ................... | B60N 2/4228 |
| 9,744,893 B2* | 8/2017 | Zaiki | ...................... | B60N 2/682 |
| 2004/0111864 A1* | 6/2004 | Skinner | ................... | B23P 9/025 |
| | | | | 29/523 |
| 2005/0168043 A1* | 8/2005 | Manfredotti | ........... | B64D 25/04 |
| | | | | 297/452.18 |
| 2006/0055225 A1* | 3/2006 | Yasuda | ................... | B60N 2/58 |
| | | | | 297/452.18 |
| 2015/0307006 A1* | 10/2015 | Hayashi | ................. | B60R 22/26 |
| | | | | 297/344.13 |
| 2016/0368404 A1* | 12/2016 | Sammons | ................ | B60N 2/54 |
| 2018/0118068 A1* | 5/2018 | Onuma | ................... | B60N 2/68 |
| 2018/0339618 A1* | 11/2018 | Inoue | ...................... | B60N 2/68 |
| 2018/0339619 A1* | 11/2018 | Inoue | ...................... | B60N 2/68 |

* cited by examiner

VEHICLE SEAT

This nonprovisional application is based on Japanese Patent Application No. 2017-104968 filed on May 26, 2017 with the Japan Patent Office, the entire contents of which are hereby incorporated by reference.

BACKGROUND

Field

The present disclosure relates to a vehicle seat.

Description of the Background Art

A technique of joining a plurality of members together by welding is known for assembling various members such as a frame provided inside a vehicle seat and constituting its framework, as disclosed in Japanese Patent Laying-Open No. 2015-003645.

SUMMARY

When joining a plurality of members together by welding, it is difficult to improve the productivity in a step of joining the members together. Separate equipment for the welding is needed, and a processing cost for the welding is also needed. It is preferable to join various members such as a frame constituting the framework of a vehicle seat while avoiding the use of a welding process as much as possible.

An object of the present specification is to disclose a vehicle seat having a configuration that allows a plurality of members constituting a framework of the vehicle seat to be joined together without using a welding process.

A vehicle seat based on one aspect of the present disclosure includes: first and second side frames arranged at a distance from each other in a width direction; a cushion panel arranged between the first and second side frames; and an insertion member for fixing the cushion panel to the first side frame, one of the first side frame and the cushion panel being provided with an elastically deformed portion, the elastically deformed portion being formed to extend in the width direction and including an outer circumferential surface and an inner circumferential surface, the outer circumferential surface being configured to be expanded outward by insertion of the insertion member on the inner side of the inner circumferential surface, the other of the first side frame and the cushion panel not provided with the elastically deformed portion being provided with a recess forming portion, the recess forming portion being formed to extend in the width direction and facing the outer circumferential surface of the elastically deformed portion, the recess forming portion having an inner surface configured to be brought into pressure contact with the outer circumferential surface expanded by insertion of the insertion member.

A vehicle seat based on another aspect of the present disclosure includes: a pair of side frames arranged at a distance from each other in a width direction and each including a front frame portion and a rear frame portion; a cushion panel arranged between the pair of side frames; and an insertion member for fixing the front frame portion and the rear frame portion together, one of the front frame portion and the rear frame portion being provided with an elastically deformed portion, the elastically deformed portion being formed to extend in the width direction and including an outer circumferential surface and an inner circumferential surface, the outer circumferential surface being configured to be expanded outward by insertion of the insertion member on the inner side of the inner circumferential surface, the other of the front frame portion and the rear frame portion being provided with a recess forming portion, the recess forming portion being formed to extend in the width direction and facing the outer circumferential surface of the elastically deformed portion, the recess forming portion having an inner surface configured to be brought into pressure contact with the outer circumferential surface expanded by insertion of the insertion member.

The foregoing and other objects, features, aspects and advantages disclosed in the present specification will become more apparent from the following detailed description when taken in conjunction with the accompanying drawings.

DESCRIPTION OF THE PREFERRED EMBODIMENTS

Figure 1:
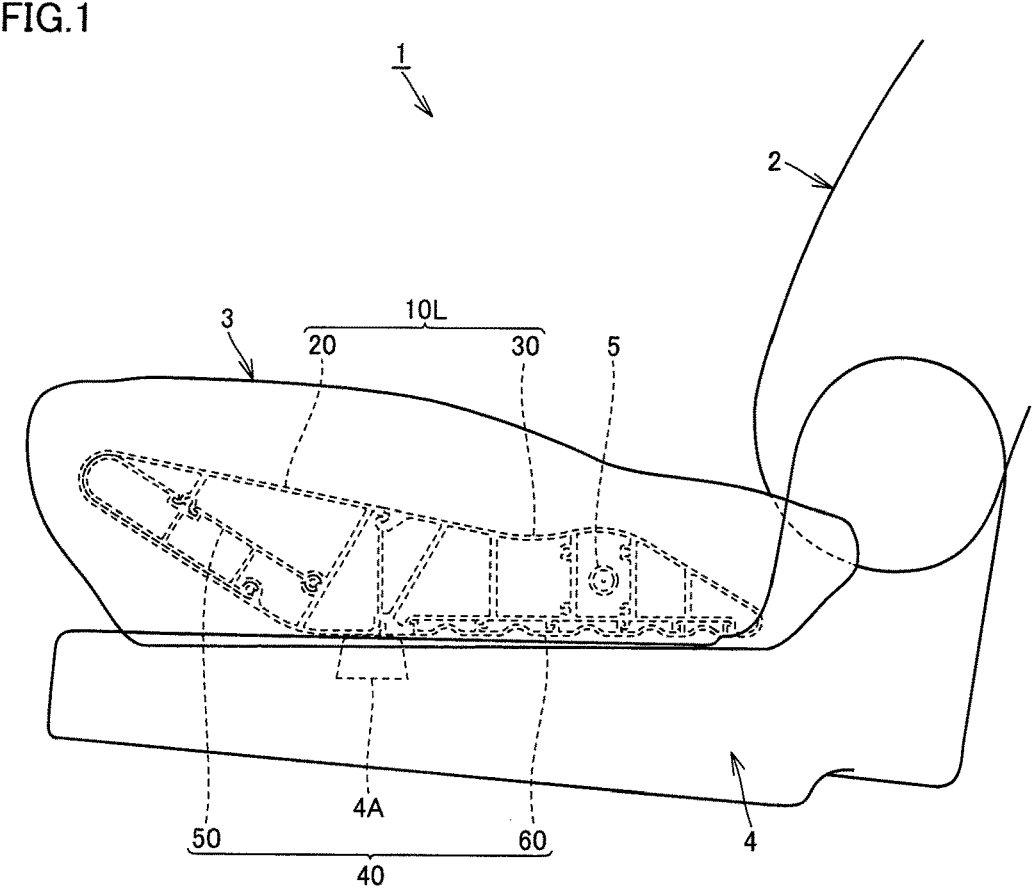
FIG. 1 is a side view showing a general configuration of a vehicle seat 1.

An embodiment will be described hereinafter with reference to the drawings. The same and corresponding components are designated by the same reference numerals and redundant description may not be repeated.

[Vehicle Seat 1]

FIG. 1 is a side view showing a general configuration of a vehicle seat 1. Vehicle seat 1 is configured as a back seat of an automobile, for example. Vehicle seat 1 has a seat back 2 serving as a backrest portion of a seated passenger, a seat cushion 3 serving as a sitting portion, and a base 4 to support these seat back 2 and seat cushion 3 with respect to a floor of the vehicle.

Lower end portions on the right and left sides of seat back 2 are coupled to rear end portions on the right and left sides of base 4 through a recliner (not shown), respectively. A backrest angle of seat back 2 is held in a fixed state under normal conditions. The fixed state of the backrest angle of seat back 2 is released by operation of a tip-up lever (not shown) provided on an outer portion of base 4. Seat back 2 is biased such that it is folded forward to a position where it assumes a forward leaning posture and held there.

A hinge shaft 5 having an axial direction oriented at a direction parallel to the width direction (the right to left direction of vehicle seat 1) is provided inside seat cushion 3. Rear portions on the right and left sides of seat cushion 3 are rotatably coupled to rear portions on the right and left sides of base 4 through hinge shaft 5, respectively. Seat cushion 3 is coupled to base 4 through a tip-up mechanism (not shown). Under normal conditions, seat cushion 3 is fixed in a state of the seating position where it is collapsed on base 4 (cushion rubber 4A), and held in the state that allows the seated passenger to sit on the upper side of seat cushion 3.

The fixed state of seat cushion 3 at the seating position with respect to base 4 is released by operation of the tip-up lever (not shown). Seat cushion 3 is biased such that it is tipped up rearward to a predetermined tipped-up position around hinge shaft 5 and held there. As a result of this tip-up operation, seat cushion 3 and seat back 2 that has been folded forward to the forward leaning position are brought into a state where they are stacked on each other in the front to rear direction of the seat.

By simultaneously performing the operation of folding seat back 2 forward and the operation of tipping up seat cushion 3 rearward, seat back 2 and seat cushion 3 are brought into a state where they are compactly folded on each other in the front to rear direction of the seat. Slide rails (not shown) are provided between base 4 and the floor of the vehicle. By sliding the entire vehicle seat 1 forward by the slide rails after the tip-up operation, the space where vehicle seat 1 was installed is turned into a space which opens widely rearward.

Provided inside seat cushion 3 operated as described above are a pair of side frames (side frames 10L and 10R) and a cushion panel (cushion panel 40) as framework members of seat cushion 3. As will be described later in detail, each of side frames 10L and 10R includes a front frame portion 20 and a rear frame portion 30 (see FIGS. 3 to 6 and the like). Cushion panel 40 includes a front panel portion 50 and a rear panel portion 60 (see FIGS. 3 to 6 and the like). These features will now be described.

Figure 2:
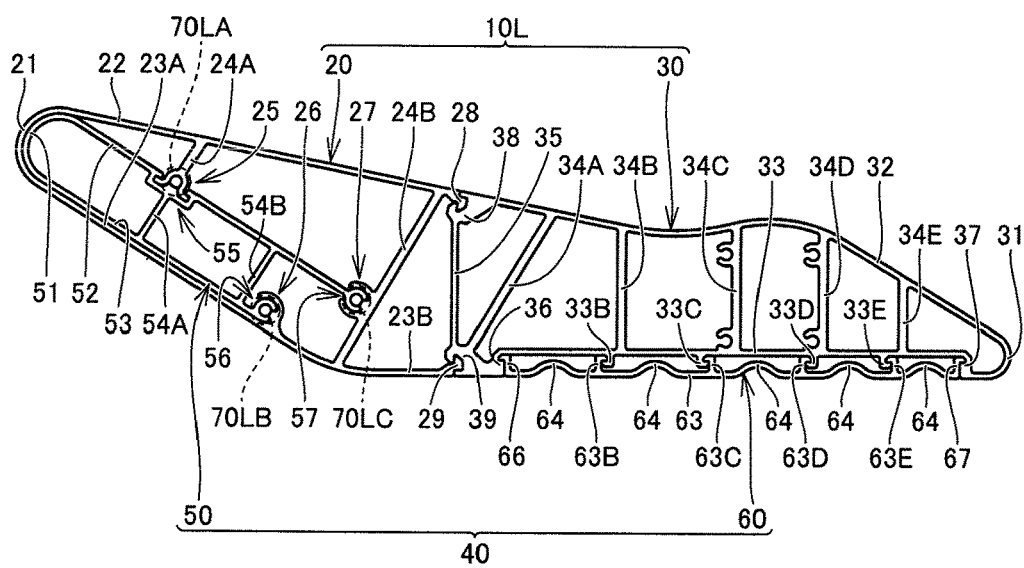
FIG. 2 is a side view showing a side frame 10L and a cushion panel 40.
Figure 3:
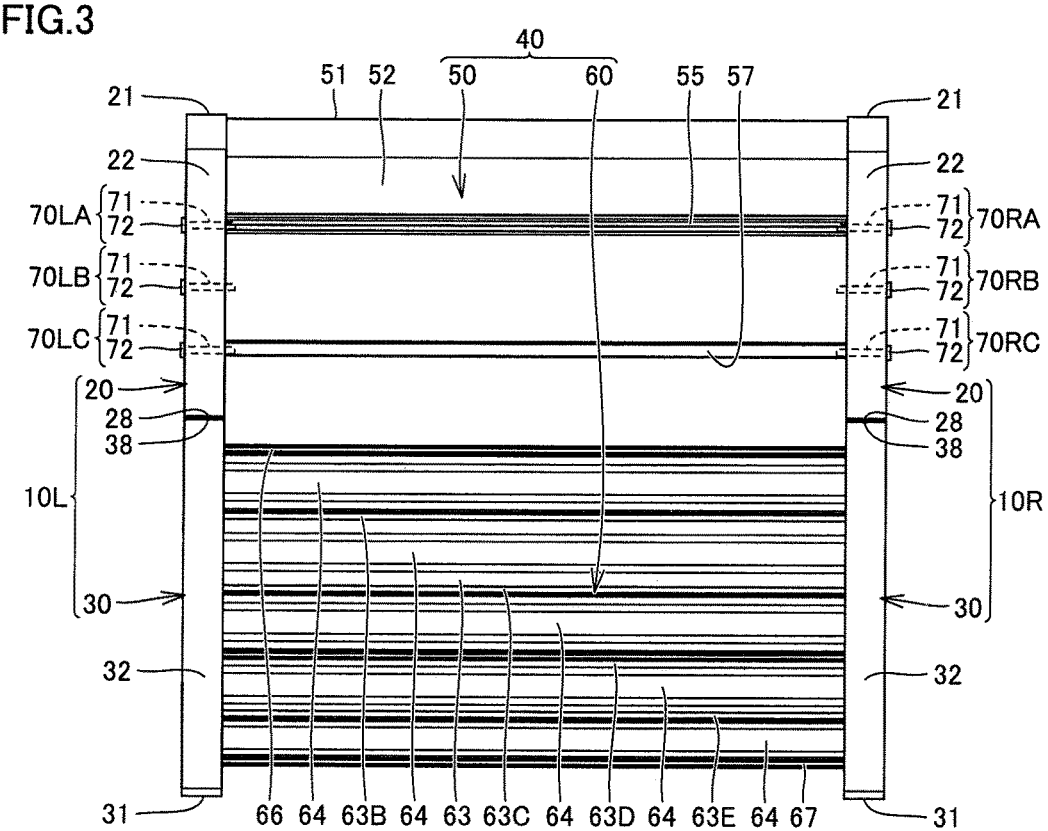
FIG. 3 is a plan view showing side frames 10L, 10R and cushion panel 40.
Figure 4:
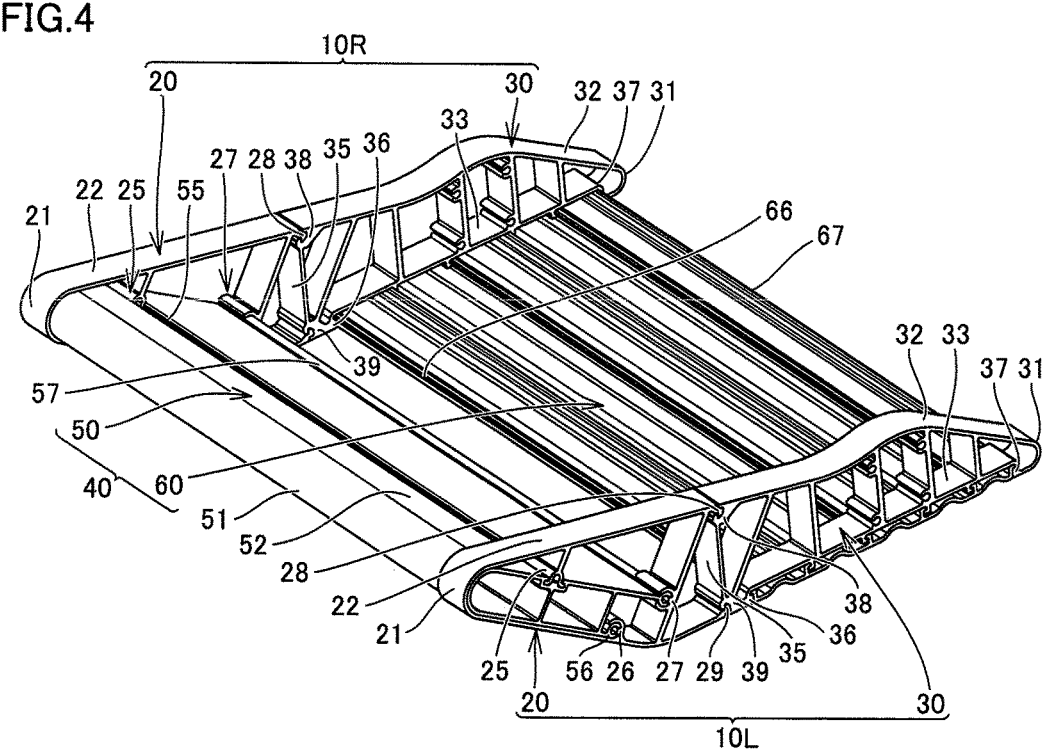
FIG. 4 is a perspective view showing a mode of external appearance of side frames 10L, 10R and cushion panel 40 visually recognized as seen from the front of a diagonal upper left corner.
Figure 5:
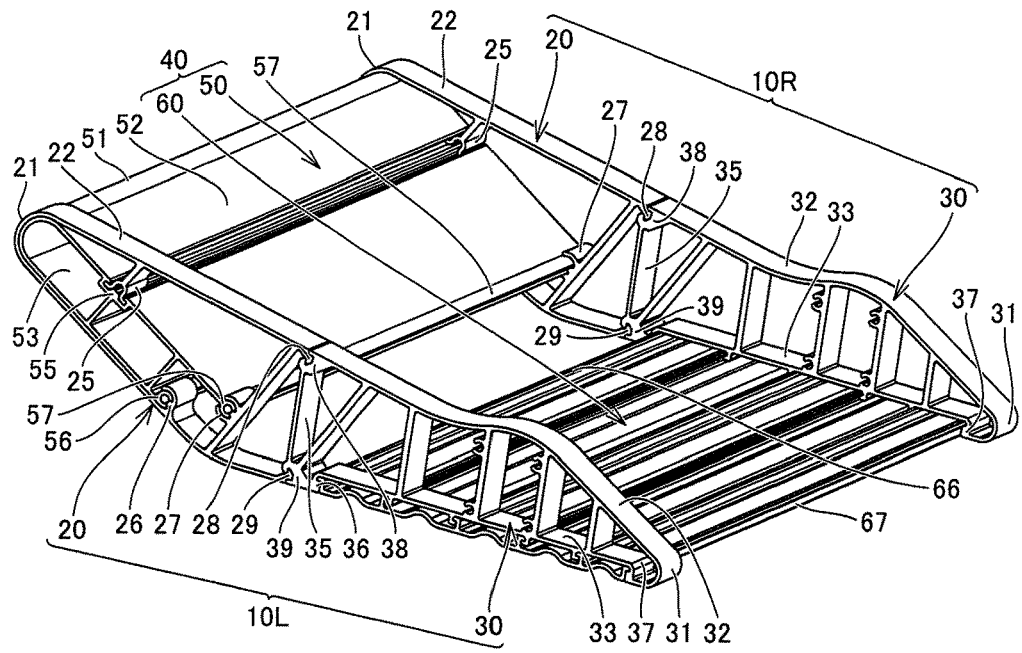
FIG. 5 is a perspective view showing a mode of external appearance of side frames 10L, 10R and cushion panel 40 visually recognized as seen from the rear of the diagonal upper left corner.
Figure 6:
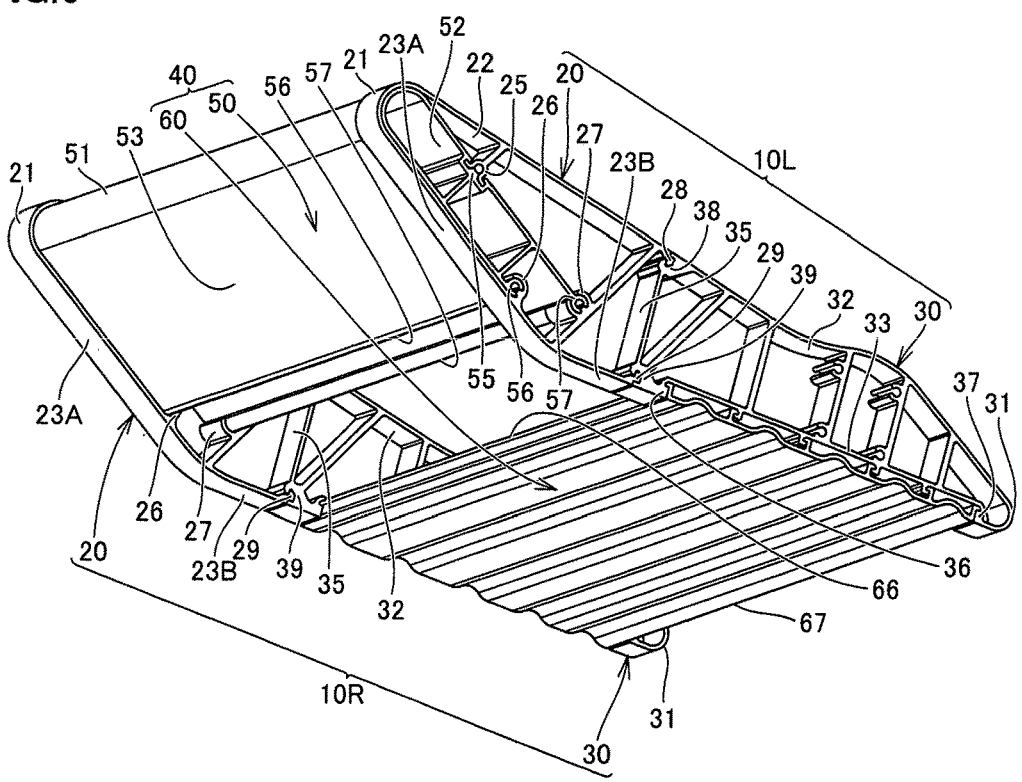
FIG. 6 is a perspective view showing a mode of external appearance of side frames 10L, 10R and cushion panel 40 visually recognized as seen from the front of a diagonal lower left corner.

FIG. 2 is a side view showing side frame 10L and cushion panel 40. FIG. 3 is a plan view showing side frames 10L, 10R and cushion panel 40. FIG. 4 is a perspective view showing a mode of external appearance of side frames 10L, 10R and cushion panel 40 visually recognized as seen from the front of a diagonal upper left corner. FIG. 5 is a perspective view showing a mode of external appearance of side frames 10L, 10R and cushion panel 40 visually recognized as seen from the rear of the diagonal upper left corner. FIG. 6 is a perspective view showing a mode of external appearance of side frames 10L, 10R and cushion panel 40 visually recognized as seen from the front of a diagonal lower left corner.

Referring to FIGS. 2 to 6, vehicle seat 1 (FIG. 1) has the pair of side frames 10L and 10R (FIG. 3) arranged at a distance from each other in the width direction (the right to left direction of vehicle seat 1), cushion panel 40 arranged between the pair of side frames 10L and 10R, and screws 70LA, 70LB, 70LC, 70RA, 70RB, 70RC (FIG. 3) as insertion members for fixing cushion panel 40 to the pair of side frames 10L and 10R. For the convenience of illustration, screws 70LA, 70LB, 70LC, 70RA, 70RB and 70RC (see FIG. 7) are not depicted in FIGS. 4 to 6 as well as FIG. 13 and the like which will be described later.

[Side Frames 10L and 10R]

Figure 7:
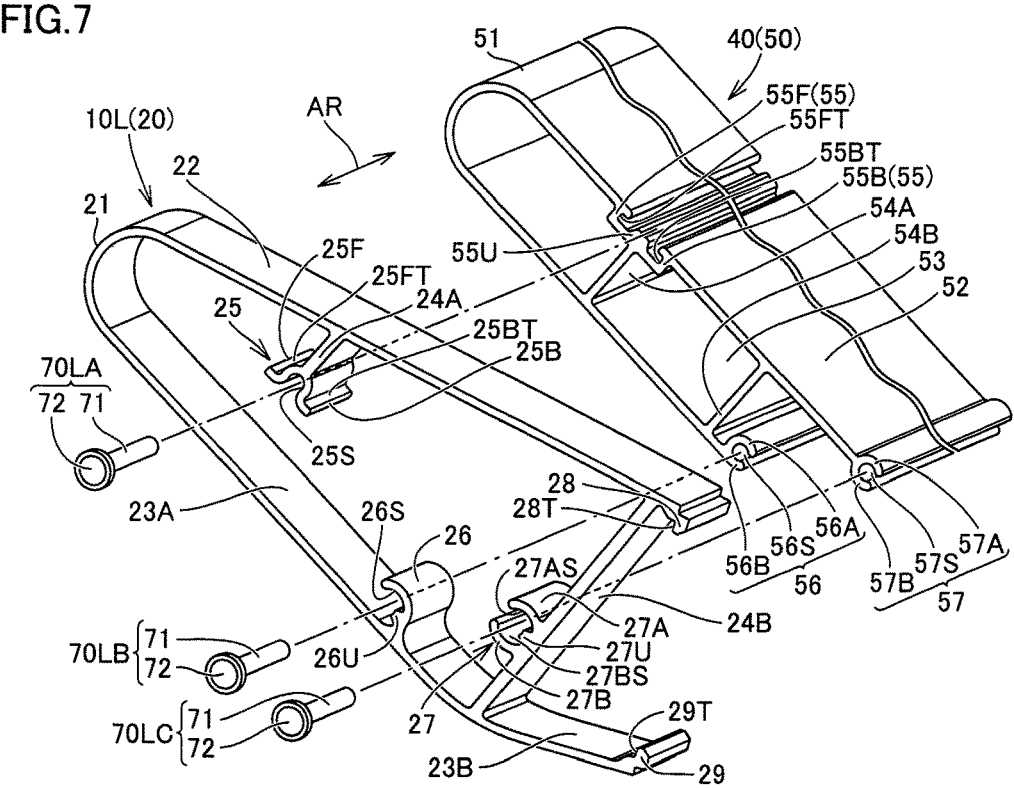
FIG. 7 is a perspective view showing a front frame portion 20 provided on side frame 10L and a front panel portion 50 provided on cushion panel 40 in a separated state.

Each of side frames 10L and 10R includes front frame portion 20 and rear frame portion 30. Front frame portion 20 provided on side frame 10L and front frame portion 20 provided on side frame 10R have the same configuration. Rear frame portion 30 provided on side frame 10L and rear frame portion 30 provided on side frame 10R have the same configuration. FIG. 7 is a perspective view showing front frame portion 20 provided on side frame 10L and front panel portion 50 provided on cushion panel 40 in a separated state.

[Front Frame Portion 20]

Referring mainly to FIGS. 2 and 7, front frame portion 20 has a front end portion 21, an upper flat plate portion 22, lower flat plate portions 23A, 23B, a suspended portion 24A, a connecting portion 24B, an elastically deformed portion 25, recess forming portions 26, 27, a rear upper fitting portion 28, and a rear lower fitting portion 29. Each of them is formed to extend in the width direction (a direction of an arrow AR shown in FIG. 7) of vehicle seat 1 (FIG. 1). Front frame portion 20 is fabricated by being cut from an extrusion material made of an aluminum alloy or a magnesium alloy having a constant cross-sectional shape in a direction orthogonal to the width direction.

Front end portion 21 has the shape of a curved plate curved in a semi-circular arc. Upper flat plate portion 22 is continuous with an upper portion of front end portion 21, and extends in the form of a flat plate from the upper portion of front end portion 21 toward the position of rear upper fitting portion 28. Lower flat plate portion 23A is continuous with a lower portion of front end portion 21. Lower flat plate portion 23A extends such that the spacing in a height direction between lower flat plate portion 23A and upper flat plate portion 22 gradually increases from the front side to the rear side. Lower flat plate portion 23B is continuous with the rear end of lower flat plate portion 23A, and extends in the form of a flat plate from the rear end of lower flat plate portion 23A toward the position of rear lower fitting portion 29.

Suspended portion 24A is provided to hang down from a portion of upper flat plate portion 22 located between front end portion 21 and rear upper fitting portion 28 toward lower flat plate portion 23A. Suspended portion 24A extends in the form of a flat plate from this portion for a length that does not reach lower flat plate portion 23A, and extends in a direction generally orthogonal to lower flat plate portion 23A.

Figure 8:
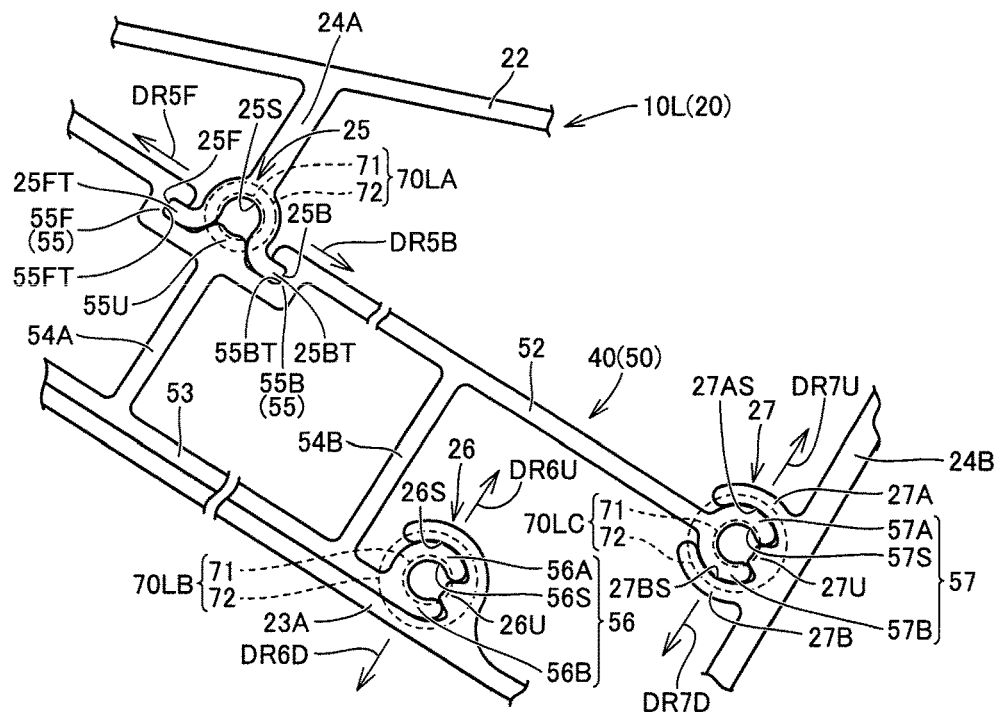
FIG. 8 is a side view showing front frame portion 20 provided on side frame 10L and front panel portion 50 provided on cushion panel 40 in an assembled state.

Connecting portion 24B has the shape of a flat plate, and connects a portion located between lower flat plate portion 23A and lower flat plate portion 23B, and a portion of upper flat plate portion 22 in proximity to rear upper fitting portion 28. Front end portion 21, upper flat plate portion 22, connecting portion 24B, and lower flat plate portion 23A assume a continuous and closed annular shape (frame shape)

as a whole. FIG. 8 is a side view showing front frame portion 20 provided on side frame 10L and front panel portion 50 provided on cushion panel 40 in an assembled state.

(Elastically Deformed Portion 25)

As shown in FIGS. 7 and 8, elastically deformed portion 25 is provided at the lower end of suspended portion 24A. Elastically deformed portion 25 is also formed to extend in the width direction (the direction of arrow AR). Elastically deformed portion 25 includes an outer circumferential surface located in front of suspended portion 24A (a front end 25F of the outer circumferential surface), an outer circumferential surface located behind suspended portion 24A (a rear end 25B of the outer circumferential surface), and an inner circumferential surface 25S located opposite to suspended portion 24A (on the lower flat plate portion 23A side).

Inner circumferential surface 25S has a substantially C-shaped cross-sectional shape, and opens toward lower flat plate portion 23A (FIG. 7). The front side of inner circumferential surface 25S is provided with a forwardly extending first piece portion 25FT. An end face of first piece portion 25FT in the forwardly extending direction forms front end 25F. Front end 25F is part of the outer circumferential surface of elastically deformed portion 25. The rear side of inner circumferential surface 25S is provided with a rearwardly extending second piece portion 25BT. An end face of second piece portion 25BT in the rearwardly extending direction forms rear end 25B. Rear end 25B is part of the outer circumferential surface of elastically deformed portion 25.

(Recess Forming Portions 26 and 27)

Recess forming portion 26 has the shape of a curved plate extending to describe a semi-circular arc forward, while extending upward from lower flat plate portion 23A toward upper flat plate portion 22. Recess forming portion 26 is also formed to extend in the width direction (the direction of arrow AR). Recess forming portion 26 includes an inner surface 26S, with a forwardly projecting protrusion 26U being formed on inner surface 26S.

Recess forming portion 27 includes curved portions 27A and 27B extending in the width direction (the direction of arrow AR). Curved portions 27A and 27B face each other, and extend such that each describes a semi-circular arc forward from connecting portion 24B. Recess forming portion 27 includes inner surfaces 27AS and 27BS, with a forwardly projecting protrusion 27U being formed between inner surfaces 27AS and 27BS.

(Rear Upper Fitting Portion 28 and Rear Lower Fitting Portion 29)

Figure 9:
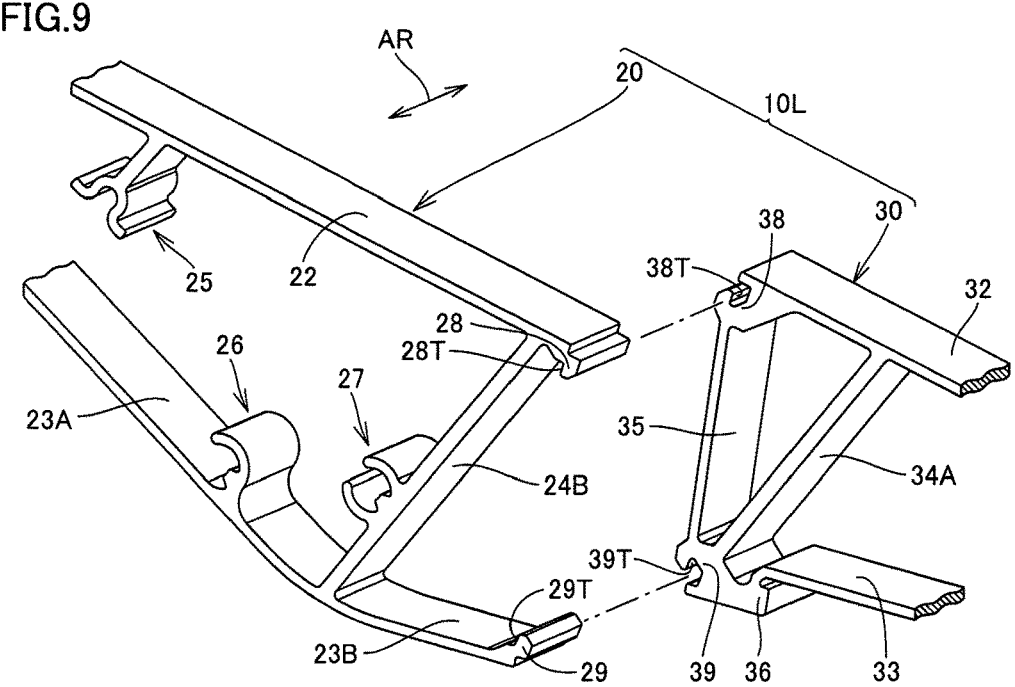
FIG. 9 is a perspective view showing front frame portion 20 and a rear frame portion 30 provided on side frame 10L in a separated state.
Figure 10:
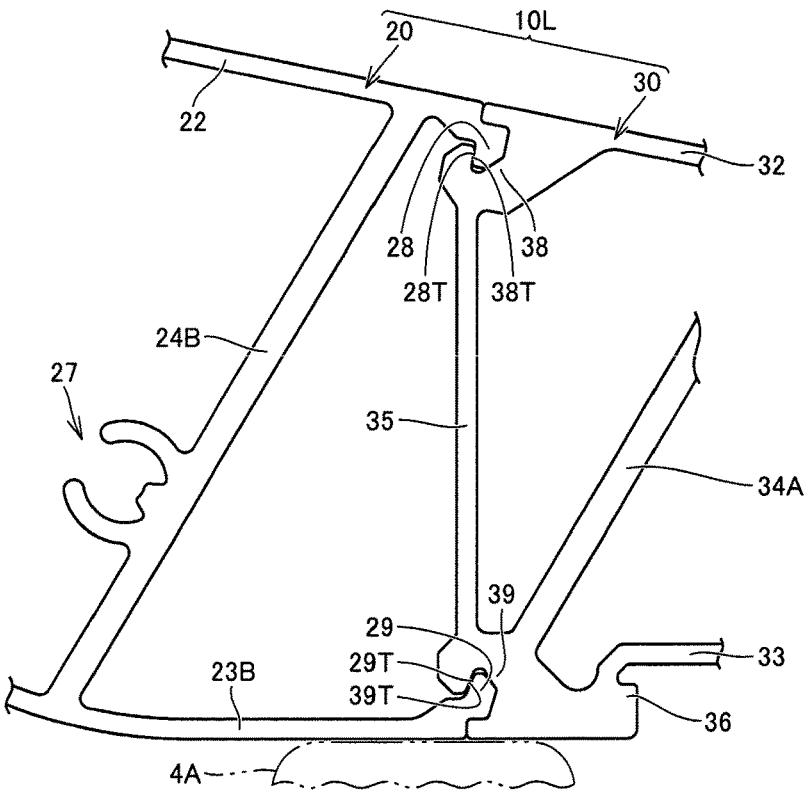
FIG. 10 is a side view showing front frame portion 20 and rear frame portion 30 provided on side frame 10L in an assembled state.

FIG. 9 is a perspective view showing front frame portion 20 and rear frame portion 30 provided on side frame 10L in a separated state. FIG. 10 is a side view showing front frame portion 20 and rear frame portion 30 provided on side frame 10L in an assembled state. As shown in FIGS. 9 and 10, rear upper fitting portion 28 is formed at a rear portion of upper flat plate portion 22 (front frame portion 20), and rear lower fitting portion 29 is formed at a rear portion of lower flat plate portion 23B (front frame portion 20).

Rear upper fitting portion 28 has a protruding shape extending downward from above in the above-described state of the seating position (the state shown in FIG. 1). Rear upper fitting portion 28 is provided with a rear upper inclined surface 28T extending obliquely downward and forward in the above-described state of the seating position. Rear upper inclined surface 28T is formed by a forwardly facing portion of a surface of rear upper fitting portion 28.

Rear lower fitting portion 29 has a protruding shape extending upward from below in the above-described state of the seating position (the state shown in FIG. 1). Rear lower fitting portion 29 is provided with a rear lower inclined surface 29T extending obliquely upward and rearward in the above-described state of the seating position. Rear lower inclined surface 29T is formed by a forwardly facing portion of a surface of rear lower fitting portion 29.

[Rear Frame Portion 30]

Figure 11:
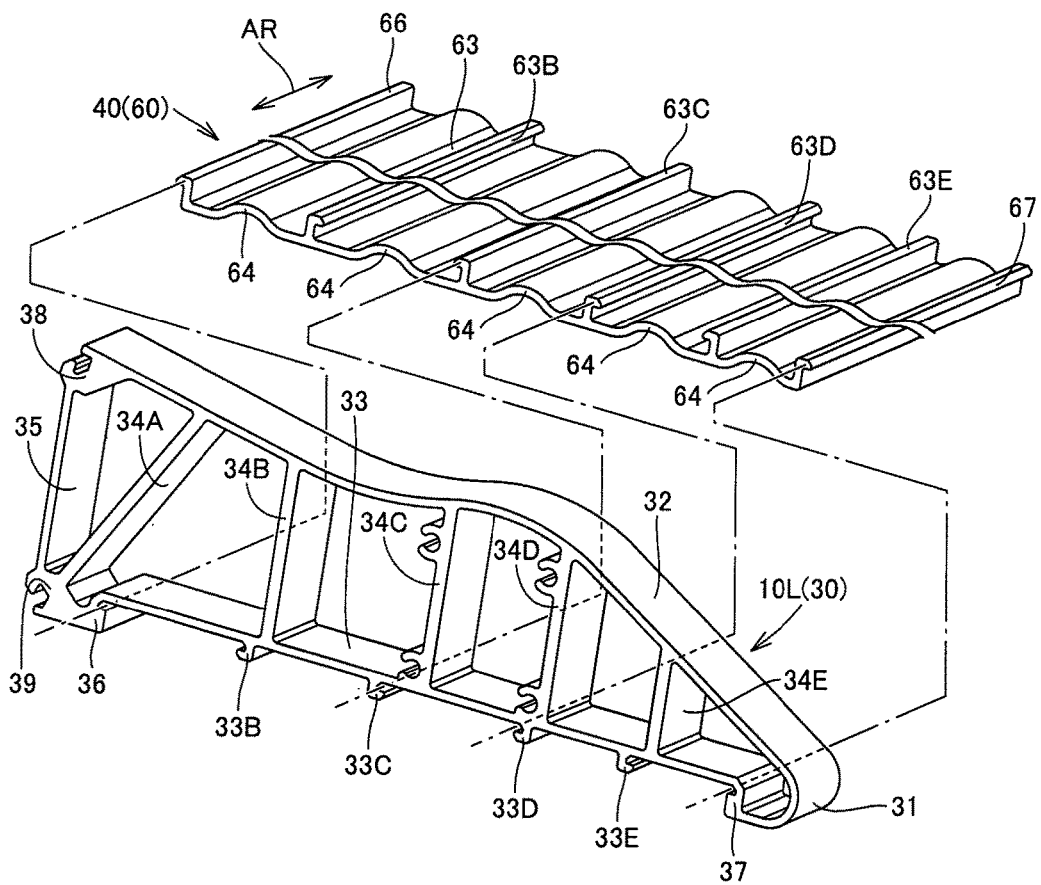
FIG. 11 is a perspective view showing rear frame portion 30 provided on side frame 10L and a rear panel portion 60 provided on cushion panel 40 in a separated state.
Figure 12:
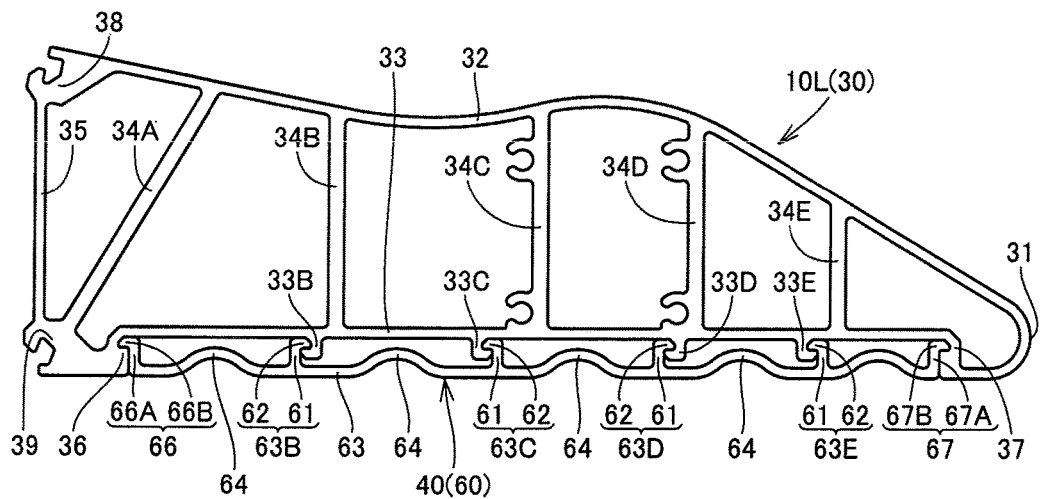
FIG. 12 is a side view showing rear frame portion 30 provided on side frame 10L and rear panel portion 60 provided on cushion panel 40 in an assembled state.

FIG. 11 is a perspective view showing rear frame portion 30 provided on side frame 10L and rear panel portion 60 provided on cushion panel 40 in a separated state. FIG. 12 is a side view showing rear frame portion 30 provided on side frame 10L and rear panel portion 60 provided on cushion panel 40 in an assembled state.

Referring mainly to FIGS. 2, 11 and 12, rear frame portion 30 has a rear end portion 31, an upper flat plate portion 32, a lower flat plate portion 33, fitting portions 33B, 33C, 33D, 33E, pillar portions 34A, 34B, 34C, 34D, 34E, a support rib 35, a front end fitting portion 36, a rear end fitting portion 37, a front upper fitting portion 38, and a front lower fitting portion 39. Each of them is formed to extend in the width direction (the direction of arrow AR shown in FIG. 11) of vehicle seat 1 (FIG. 1).

Rear frame portion 30 is also fabricated by being cut from an extrusion material made of an aluminum alloy or a magnesium alloy having a constant cross-sectional shape in the direction orthogonal to the width direction. Rear end portion 31, upper flat plate portion 32, front upper fitting portion 38, support rib 35, front lower fitting portion 39, front end fitting portion 36, lower flat plate portion 33 and rear end fitting portion 37 assume a continuous and closed annular shape (frame shape) as a whole.

(Fitting Portions 33B, 33C, 33D, 33E, Front End Fitting Portion 36 and Rear End Fitting Portion 37)

Rear end portion 31 has the shape of a curved plate curved in a semi-circular arc. Upper flat plate portion 32 is continuous with an upper portion of rear end portion 31, and extends from the upper portion of rear end portion 31 toward the position of front upper fitting portion 38. The front side of a lower portion of rear end portion 31 is provided with rear end fitting portion 37. Lower flat plate portion 33 is provided between rear end fitting portion 37 and front end fitting portion 36. Fitting portions 33B, 33C, 33D and 33E are provided on a lower surface of lower flat plate portion 33 to hang down therefrom. The front side of front end fitting portion 36 is provided with front lower fitting portion 39.

Pillar portion 34A has the shape of a flat plate, and is provided so as to connect upper flat plate portion 32 and front lower fitting portion 39. Pillar portion 34A extends obliquely upward and rearward from front lower fitting portion 39 in the above-described state of the seating position (the state shown in FIG. 1). Pillar portions 34B, 34C, 34D and 34E each have the shape of a flat plate, and are provided substantially parallel to one another so as to connect upper flat plate portion 32 and lower flat plate portion 33. Pillar portions 34B, 34C, 34D and 34E extend in a direction generally orthogonal to lower flat plate portion 33. Pillar portions 34B, 34C, 34D and 34E extend vertically upward from lower flat plate portion 33 in the above-described state of the seating position.

Fitting portions 33B, 33C, 33D and 33E are provided between front end fitting portion 36 and rear end fitting portion 37. Fitting portions 33B, 33C, 33D and 33E are located generally across lower flat plate portion 33 from pillar portions 34B, 34C, 34D and 34E, respectively. In the above-described state of the seating position, front end fitting portion 36 and fitting portions 33C, 33E each include a rearwardly opening inner circumferential surface, and fitting portions 33B, 33D and rear end fitting portion 37 each include a forwardly opening inner circumferential surface.

(Front Upper Fitting Portion 38 and Front Lower Fitting Portion 39)

As shown in FIGS. 9 and 10, front upper fitting portion 38 is formed on the front side of upper flat plate portion 32 (rear frame portion 30), and front lower fitting portion 39 is formed on the front side of front end fitting portion 36 (rear frame portion 30). Rear upper fitting portion 28 and front upper fitting portion 38 are fitted together while making slide-contact with each other in the width direction, while rear lower fitting portion 29 and front lower fitting portion 39 are fitted together while making slide-contact with each other in the width direction, thereby causing front frame portion 20 and rear frame portion 30 to be integrated together to form side frame 10L. This is also the case with side frame 10R (see FIGS. 3 to 6 and the like).

Front upper fitting portion 38 has an upwardly opening recessed shape in the above-described state of the seating position (the state shown in FIG. 1). Front upper fitting portion 38 is provided with a front upper inclined surface 38T extending obliquely upward and rearward in the above-described state of the seating position. Front upper inclined surface 38T is formed by a rearwardly facing portion of a surface of front upper fitting portion 38.

Front lower fitting portion 39 has a downwardly opening recessed shape in the above-described state of the seating position (the state shown in FIG. 1). Front lower fitting portion 39 is provided with a front lower inclined surface 39T extending obliquely downward and forward in the above-described state of the seating position. Front lower inclined surface 39T is formed by a rearwardly facing portion of a surface of front lower fitting portion 39.

When rear upper fitting portion 28 and front upper fitting portion 38 are being fitted together, rear upper inclined surface 28T and front upper inclined surface 38T are locked to each other (both elements are brought into intimate contact with each other and thereby integrated to have such a relation that they behave together). Similarly, when rear lower fitting portion 29 and front lower fitting portion 39 are being fitted together, rear lower inclined surface 29T and front lower inclined surface 39T are locked to each other.

(Support Rib 35)

Support rib 35 connecting front upper fitting portion 38 and front lower fitting portion 39 is provided at a position of rear frame portion 30 between front upper fitting portion 38 and front lower fitting portion 39. Support rib 35 has the shape of a flat plate, and is provided substantially parallel to pillar portions 34B, 34C, 34D and 34E (FIG. 2). Support rib 35 extends along a direction identical to the direction generally orthogonal to lower flat plate portion 33. Support rib 35 extends along a direction generally parallel to the vertical direction in the above-described state of the seating position.

[Cushion Panel 40]

As shown in FIGS. 1 to 6, cushion panel 40 includes front panel portion 50 and rear panel portion 60 configured as separate members. When cushion panel 40 has been fixed to side frames 10L and 10R, front panel portion 50 and rear panel portion 60 are spaced apart from each other in the front to rear direction.

[Front Panel Portion 50]

Referring mainly to FIGS. 2 and 7, front panel portion 50 provided on cushion panel 40 has a front end portion 51, an upper surface portion 52, a lower surface portion 53, pillar portions 54A, 54B, a recess forming portion 55, and elastically deformed portions 56, 57. Each of them is formed to extend in the width direction (the direction of arrow AR shown in FIG. 7) of vehicle seat 1 (FIG. 1). Front panel portion 50 is fabricated by being cut from an extrusion material made of an aluminum alloy or a magnesium alloy having a constant cross-sectional shape in the direction orthogonal to the width direction.

Front end portion 51 has the shape of a curved plate curved in a semi-circular arc, and a portion of front end portion 51 close to the end in the width direction is arranged on the inner side of front end portion 21. Upper surface portion 52 is continuous with an upper portion of front end portion 51, and extends in the form of a flat plate from the upper portion of front end portion 51 toward the position of elastically deformed portion 57. Lower surface portion 53 is continuous with a lower portion of front end portion 51, and extends in the form of a flat plate from the lower portion of front end portion 51 toward the position of elastically deformed portion 56. Upper surface portion 52 and lower surface portion 53 are substantially parallel to each other.

Pillar portion 54A is provided to extend upward from a portion of lower surface portion 53 located between front end portion 51 and elastically deformed portion 56 toward a portion (recess forming portion 55) of upper surface portion 52 located between front end portion 51 and elastically deformed portion 57. Pillar portion 54A extends in the form of a flat plate, and is generally orthogonal to lower surface portion 53. The tip end (upper end) of pillar portion 54A in its extending direction is provided with recess forming portion 55 which will be described later.

Pillar portion 54B connects a portion of lower surface portion 53 located between pillar portion 54A and elastically deformed portion 56, and a portion of upper surface portion 52 located between recess forming portion 55 and elastically deformed portion 57. Pillar portion 54B also extends in the form of a flat plate, and is generally orthogonal to lower surface portion 53.

(Recess Forming Portion 55)

Referring to FIGS. 7 and 8, front panel portion 50 in the present embodiment includes a plurality of recess forming portions 55. Specifically, upper surface portion 52 is provided with a first recess forming portion 55F and a second recess forming portion 55B. First recess forming portion 55F and second recess forming portion 55B are also formed to extend in the width direction (the direction of arrow AR shown in FIG. 7).

First recess forming portion 55F includes a rearwardly opening inner surface 55FT, and second recess forming portion 55B includes a forwardly opening inner surface 55BT. First recess forming portion 55F and second recess forming portion 55B are formed such that inner surfaces 55FT and 55BT face each other in the front to rear direction in the above-described state of the seating position (the state shown in FIG. 1). An upwardly projecting protrusion 55U is formed between inner surfaces 55FT and 55BT.

(Screw 70LA)

As shown in FIGS. 3, 7 and 8, screw 70LA as an insertion member is used to fix cushion panel 40 (front panel portion 50) to side frame 10L (front frame portion 20). Screw 70LA includes a shank 71 and a head 72.

Specifically, front frame portion 20 and front panel portion 50 are assembled together while making slide-contact with each other in the width direction, such that first piece portion 25FT of elastically deformed portion 25 is located on the inner side of first recess forming portion 55F and second piece portion 25BT of elastically deformed portion 25 is located on the inner side of second recess forming portion 55B. In the assembled state, inner surface 55FT of first recess forming portion 55F faces an outer circumferential surface of first piece portion 25FT (front end 25F), and inner surface 55BT of second recess forming portion 55B faces an outer circumferential surface of second piece portion 25BT (rear end 25B). A substantially cylindrical space is formed between the surface of protrusion 55U and inner circumferential surface 25S of elastically deformed portion 25. Shank 71 has a diameter larger than this space, and is press fitted into this space from the outer side in the width direction.

The insertion of shank 71 on the inner side of inner circumferential surface 25S causes an increase in distance between first piece portion 25FT (front end 25F) and second piece portion 25BT (rear end 25B). The outer circumferential surface of first piece portion 25FT is expanded outward (forward) (arrow DR5F), and the outer circumferential surface of first piece portion 25FT expanded by the insertion of shank 71 is brought into pressure contact with inner surface 55FT of first recess forming portion 55F. Similarly, the outer circumferential surface of second piece portion 25BT is expanded outward (rearward) (arrow DR5B), and the outer circumferential surface of second piece portion 25BT expanded by the insertion of shank 71 is brought into pressure contact with inner surface 55BT of second recess forming portion 55B.

The insertion of shank 71 on the inner side of inner circumferential surface 25S also causes protrusion 55U to be biased away from suspended portion 24A. With this biasing, inner surface 55FT of first recess forming portion 55F and inner surface 55BT of second recess forming portion 55B are also indirectly biased in the same direction, so that inner surface 55FT and inner surface 55BT can be brought into more strongly pressure contact with first piece portion 25FT and second piece portion 25BT, respectively.

In this state, head 72 of screw 70LA is provided on the outer side of shank 71 in the width direction, and can make contact with both elastically deformed portion 25 and recess forming portion 55 (first recess forming portion 55F and second recess forming portion 55B) from the outer side in the width direction (FIG. 3), thereby defining relative positions of elastically deformed portion 25 and recess forming portion 55 in the width direction. That is, an end face of head 72 on the shank 71 side can be pressed against both an outer end face of elastically deformed portion 25 and an outer end face of recess forming portion 55, to allow these outer end faces to be aligned flush with each other.

(Elastically Deformed Portion 56)

Referring to FIGS. 7 and 8, elastically deformed portion 56 is provided at the rear end of lower surface portion 53 of front panel portion 50. Elastically deformed portion 56 includes curved portions 56A and 56B extending in the width direction (the direction of arrow AR). Curved portions 56A and 56B face each other, and extend such that each describes a semi-circular arc rearward from the rear end of lower surface portion 53. An inner circumferential surface 56S of elastically deformed portion 56 has a surface shape which is substantially C-shaped.

(Screw 70LB)

As shown in FIGS. 3, 7 and 8, screw 70LB as an insertion member also includes shank 71 and head 72. Front frame portion 20 and front panel portion 50 are assembled together while making slide-contact with each other in the width direction, such that elastically deformed portion 56 is located on the inner side of recess forming portion 26. In the assembled state, inner surface 26S of recess forming portion 26 faces an outer circumferential surface of elastically deformed portion 56. A substantially cylindrical space is formed between the surface of protrusion 26U and inner circumferential surface 56S of elastically deformed portion 56. Shank 71 has a diameter larger than this space, and is press fitted into this space from the outer side in the width direction.

The insertion of shank 71 on the inner side of inner circumferential surface 56S causes the outer circumferential surface of elastically deformed portion 56 (curved portions 56A and 56B) to be expanded outward (arrows DR6U and DR6D), and the outer circumferential surface of elastically deformed portion 56 expanded by the insertion of shank 71 is brought into pressure contact with inner surface 26S of recess forming portion 26.

The insertion of shank 71 on the inner side of inner circumferential surface 56S also causes protrusion 26U to be biased such that it is displaced rearward. With this biasing, inner surface 26S of recess forming portion 26 is also indirectly biased in the same direction, so that inner surface 26S can be brought into more strongly pressure contact with the outer circumferential surface of elastically deformed portion 56.

In this state, head 72 of screw 70LB is provided on the outer side of shank 71 in the width direction, and can make contact with both elastically deformed portion 56 and recess forming portion 26 from the outer side in the width direction (FIG. 3), thereby defining relative positions of elastically deformed portion 56 and recess forming portion 26 in the width direction. That is, an end face of head 72 on the shank 71 side can be pressed against both an outer end face of elastically deformed portion 56 and an outer end face of recess forming portion 26, thereby allowing these outer end faces to be aligned flush with each other.

(Elastically Deformed Portion 57)

Referring to FIGS. 7 and 8, elastically deformed portion 57 is provided at the rear end of upper surface portion 52 of front panel portion 50. Elastically deformed portion 57 includes curved portions 57A and 57B extending in the width direction (the direction of arrow AR). Curved portions 57A and 57B face each other, and extend such that each describes a semi-circular arc rearward from the rear end of upper surface portion 52. An inner circumferential surface 57S of elastically deformed portion 57 has a surface shape which is substantially C-shaped.

(Screw 70LC)

As shown in FIGS. 3, 7 and 8, screw 70LC as an insertion member also includes shank 71 and head 72. Front frame portion 20 and front panel portion 50 are assembled together while making slide-contact with each other in the width direction, such that elastically deformed portion 57 is located on the inner side of recess forming portion 27. In the assembled state, inner surfaces 27AS and 27BS of recess forming portion 27 face an outer circumferential surface of elastically deformed portion 57. A substantially cylindrical space is formed between the surface of protrusion 27U and inner circumferential surface 57S of elastically deformed portion 57. Shank 71 has a diameter larger than this space, and is press fitted into this space from the outer side in the width direction.

The insertion of shank 71 on the inner side of inner circumferential surface 57S causes the outer circumferential surface of elastically deformed portion 57 (curved portions 57A and 57B) to be expanded outward (arrows DR7U and DR7D), and the outer circumferential surface of elastically deformed portion 57 expanded by the insertion of shank 71 is brought into pressure contact with inner surfaces 27AS and 27BS of recess forming portion 27.

The insertion of shank 71 on the inner side of inner circumferential surface 57S also causes protrusion 27U to be biased such that it is displaced rearward. With this biasing, inner surfaces 27AS and 27BS of recess forming portion 27 are also indirectly biased in the same direction, so that inner surfaces 27AS and 27BS can be brought into more strongly pressure contact with the outer circumferential surface of elastically deformed portion 57.

In this state, head 72 of screw 70LC is provided on the outer side of shank 71 in the width direction, and can make contact with both elastically deformed portion 57 and recess forming portion 27 from the outer side in the width direction (FIG. 3), thereby defining relative positions of elastically deformed portion 57 and recess forming portion 27 in the width direction. That is, an end face of head 72 on the shank 71 side can be pressed against both an outer end face of elastically deformed portion 57 and an outer end face of recess forming portion 27, thereby allowing these outer end faces to be aligned flush with each other.

As shown in FIG. 3, the assembly configuration using screws 70LA, 70LB and 70LC as described above is applied between front frame portion 20 of side frame 10L and front panel portion 50. By using screws 70RA, 70RB and 70RC, an assembly configuration similar to the above is also applied between front frame portion 20 of side frame 10R and front panel portion 50. Head 72 of each screw can be utilized to allow the outer end face of front frame portion 20 of side frame 10L and the outer end face of front panel portion 50 in the width direction to be readily aligned flush with each other, and also allow the outer end face of front frame portion 20 of side frame 10R and the outer end face of front panel portion 50 in the width direction to be readily aligned flush with each other.

[Rear Panel Portion 60]

Referring mainly to FIGS. 11 and 12, rear panel portion 60 provided on cushion panel 40 has a base portion 63, reinforcing ribs 63B, 63C, 63D, 63E, corrugated portions 64, a front end rib 66, and a rear end rib 67. Each of them is formed to extend in the width direction (the direction of arrow AR shown in FIG. 11) of vehicle seat 1 (FIG. 1). Rear panel portion 60 is also fabricated by being cut from an extrusion material made of an aluminum alloy or a magnesium alloy having a constant cross-sectional shape in the direction orthogonal to the width direction.

(Base Portion 63, Front End Rib 66 and Rear End Rib 67)

Base portion 63 is formed as a plate, and has a substantially rectangular outer shape in plan view (FIG. 3). In the above-described state of the seating position (the state shown in FIG. 1), front end rib 66 is provided at the front end of base portion 63, and rear end rib 67 is provided at the rear end of base portion 63 (on a rear side relative to front end rib 66). Each of front end rib 66 and rear end rib 67 extends in the width direction.

As shown in FIG. 12, front end rib 66 includes an upwardly extending portion 66A provided at the front end of base portion 63, and a hook portion 66B provided at the upper end of upwardly extending portion 66A and formed to face forward. Rear end rib 67 includes an upwardly extending portion 67A provided at the rear end of base portion 63, and a hook portion 67B provided at the upper end of upwardly extending portion 67A and formed to face rearward.

(Reinforcing Ribs 63B, 63C, 63D and 63E)

Reinforcing ribs 63B, 63C, 63D and 63E are provided on base portion 63 between front end rib 66 and rear end rib 67, and formed such that they are arranged at a distance from one another in the front to rear direction. Each of reinforcing ribs 63B and 63D includes an upwardly extending portion 61, and a hook portion 62 provided at the upper end of upwardly extending portion 61 and formed to face rearward. Each of reinforcing ribs 63C and 63E includes upwardly extending portion 61, and hook portion 62 provided at the upper end of upwardly extending portion 61 and formed to face forward. Reinforcing ribs 63B, 63C, 63D and 63E are provided such that the reinforcing ribs each formed with forwardly facing hook portion 62 (reinforcing ribs 63C and 63E) and the reinforcing ribs each formed with rearwardly facing hook portion 62 (reinforcing ribs 63B and 63E) are alternately arranged.

(Corrugated Portions 64)

A portion of base portion 63 between adjacent reinforcing ribs 63B and 63C is provided with corrugated portion 64 formed to have a curved cross-sectional shape in the direction orthogonal to the width direction. This is also the case with a portion of base portion 63 between adjacent reinforcing ribs 63C and 63D, and a portion of base portion 63 between adjacent reinforcing ribs 63D and 63E. This is also the case with a portion of base portion 63 between front end rib 66 and reinforcing rib 63B, and a portion of base portion 63 between rear end rib 67 and reinforcing rib 63E. In the present embodiment, when rear panel portion 60 has been assembled to rear frame portion 30, each of the plurality of corrugated portions 64 has a curved cross-sectional shape protruding toward lower flat plate portion 33. The curve may be in a direction opposite to this direction, and corrugated portion 64 is not limited to have a curved cross-sectional shape but may have a bent cross-sectional shape.

Rear panel portion 60 and rear frame portion 30 are assembled together while making slide-contact with each other in the width direction, such that front end rib 66, reinforcing ribs 63B, 63C, 63D, 63E and rear end rib 67 of rear panel portion 60 are located on the inner side of front end fitting portion 36, fitting portions 33B, 33C, 33D, 33E and rear end fitting portion 37 of rear frame portion 30, respectively. Each of these ribs is fitted to each of these fitting portions, to thereby connect cushion panel 40 (rear panel portion 60) and side frame 10L (rear frame portion 30). The connection configuration as described above is similarly applied as a connection configuration between rear frame portion 30 of side frame 10R and rear panel portion 60 (see FIGS. 3 to 5).

[Summary]

As described above, front frame portion 20 of each of side frames 10L and 10R and front panel portion 50 provided on cushion panel 40 are fixed together in the mode as shown in FIGS. 7 and 8. Front frame portion 20 and rear frame portion 30 of each of side frames 10L and 10R are fixed together in the mode as shown in FIGS. 9 and 10. Rear frame portion 30 of each of side frames 10L and 10R and rear panel portion 60 provided on cushion panel 40 are fixed together in the mode as shown in FIGS. 11 and 12. Side frames 10L, 10R and cushion panel 40 in the present embodiment shown in FIGS. 4 to 6 and the like are integrated together by adopting these fixing structures.

In the present embodiment, front frame portion 20 and front panel portion 50 are fixed together using a fastening structure including screws 70LA, 70LB, 70LC, 70RA, 70RB, 70RC (FIG. 3) as insertion members, elastically deformed portions 25, 56, 57, and recess forming portions 55, 26, 27. These front frame portion 20 and front panel portion 50 constituting the framework of vehicle seat 1 (FIG. 1) can be joined together without using a welding process. As such, manufacturing costs which do not involve the costs for welding equipment and a welding process can be reduced. According to the present embodiment, manufacturing costs can be reduced for a similar reason even in comparison to an example where they are joined using rivets and the like.

In the fastening structure using screws 70LA, 70LB, 70LC, 70RA, 70RB and 70RC (see FIG. 3), head 72 of each screw can be utilized to allow the outer end face of front frame portion 20 of side frame 10L and the outer end face of front panel portion 50 in the width direction to be readily aligned flush with each other, and also allow the outer end face of front frame portion 20 of side frame 10R and the outer end face of front panel portion 50 in the width direction to be readily aligned flush with each other.

In the present embodiment (FIGS. 7 and 8), upper surface portion 52 of front panel portion 50 is provided with first recess forming portion 55F and second recess forming portion 55B. Upper surface portion 52 may be provided with only one of these recess forming portions as needed. Inner surface 55FT of first recess forming portion 55F and inner surface 55BT of second recess forming portion 55B are formed to open in opposite directions (that is, to face each other), and first piece portion 25FT and second piece portion 25BT of elastically deformed portion 25 extend in opposite directions to enter inner surface 55FT and inner surface 55BT, respectively. With this configuration, both forward and rearward movements of front panel portion 50 relative to front frame portion 20 can be effectively regulated.

In the present embodiment (FIGS. 7 and 8), front end portion 51 of front panel portion 50 is arranged on the inner side of front end portion 21 of front frame portion 20 while in contact therewith, and furthermore, elastically deformed portions 56 and 57 are provided at the rear ends of front panel portion 50 and fixed to recess forming portions 26 and 27, respectively. Even if a load from back to front acts on front panel portion 50, the load can be received not only by a portion where front end portions 21 and 51 are in contact with each other, but also by a portion where elastically deformed portion 56 and recess forming portion 26 are fixed together, and further by a portion where elastically deformed portion 57 and recess forming portion 27 are fixed together. Even under the action of such a load, forward separation of front panel portion 50 from right and left front frame portions 20 can be sufficiently suppressed.

In the present embodiment, rear panel portion 60 of cushion panel 40 is provided with reinforcing ribs 63B, 63C, 63D and 63E extending in the width direction, and rear frame portion 30 of each of side frames 10L and 10R is provided with fitting portions 33B, 33C, 33D and 33E extending in the width direction. These reinforcing ribs are fitted to these fitting portions, respectively, to thereby connect rear panel portion 60 and right and left rear frame portions 30. Reinforcing ribs 63B, 63C, 63D and 63E can perform not only the function of improving the strength of rear panel portion 60, but also the function of connecting rear panel portion 60 and right and left rear frame portions 30. Owing to the presence of reinforcing ribs 63B, 63C, 63D and 63E that also function as connection means, it is not particularly necessary to improve the strength of rear panel portion 60 by providing beads with a pressing machine or the like after the rear panel portion has been formed, whereby lowered processing costs and high productivity can be expected.

In the present embodiment, rear panel portion 60 is provided with front end rib 66 and rear end rib 67, and the pair of side frames 10L and 10R (rear panel portion 60) is provided with front end fitting portion 36 that is fitted to front end rib 66, and rear end fitting portion 37 that is fitted to rear end rib 67. Rear panel portion 60 can be connected at its front end and rear end to rear frame portion 30 by a stable structure with greater holding power. Front end rib 66 and rear end rib 67 perform not only the function of connecting rear panel portion 60 and right and left rear frame portions 30, but also the function of improving the strength of rear panel portion 60 because the ribs extend in the width direction from rear frame portion 30 of side frame 10L to reach rear frame portion 30 of side frame 10R.

In the present embodiment, corrugated portion 64 formed to have a curved or bent cross-sectional shape in the direction orthogonal to the width direction is provided at a portion between two adjacent ones of front end rib 66, rear end rib 67 and reinforcing ribs 63B, 63C, 63D, 63E. With corrugated portions 64, front end rib 66 and reinforcing ribs 63C, 63E are more likely to tilt rearward and reinforcing ribs 63B, 63D and rear end rib 67 are more likely to tilt forward than when the portions where corrugated portions 64 are provided are formed as a flat (straight) plate. Accordingly, when assembling rear panel portion 60 and rear frame portion 30 together, they can be assembled together while readily making slide-contact with each other in the width direction.

In the present embodiment, reinforcing ribs 63B, 63C, 63D and 63E are provided such that the reinforcing ribs each formed with forwardly facing hook portion 62 (reinforcing ribs 63C and 63E) and the reinforcing ribs each formed with rearwardly facing hook portion 62 (reinforcing ribs 63B and 63E) are alternately arranged. When rear panel portion 60 and rear frame portion 30 have been assembled together, a connected structure well balanced in the front to rear direction can be implemented, so that the action of stress on a partial connected portion in a concentrated manner can be suppressed.

In the present embodiment, the rear portion of front frame portion 20 is provided with rear upper fitting portion 28 and rear lower fitting portion 29 extending in the width direction, and the front portion of rear frame portion 30 is provided with front upper fitting portion 38 and front lower fitting portion 39 extending in the width direction. Front frame portion 20 and rear frame portion 30 can be fitted together while making slide-contact with each other (by a so-called sliding fit) to thereby readily form side frame 10L having them integrated together, while another front frame portion 20 and another rear frame portion 30 can also be fitted together while making slide-contact with each other to thereby readily form side frame 10R having them integrated together.

Figure 13:
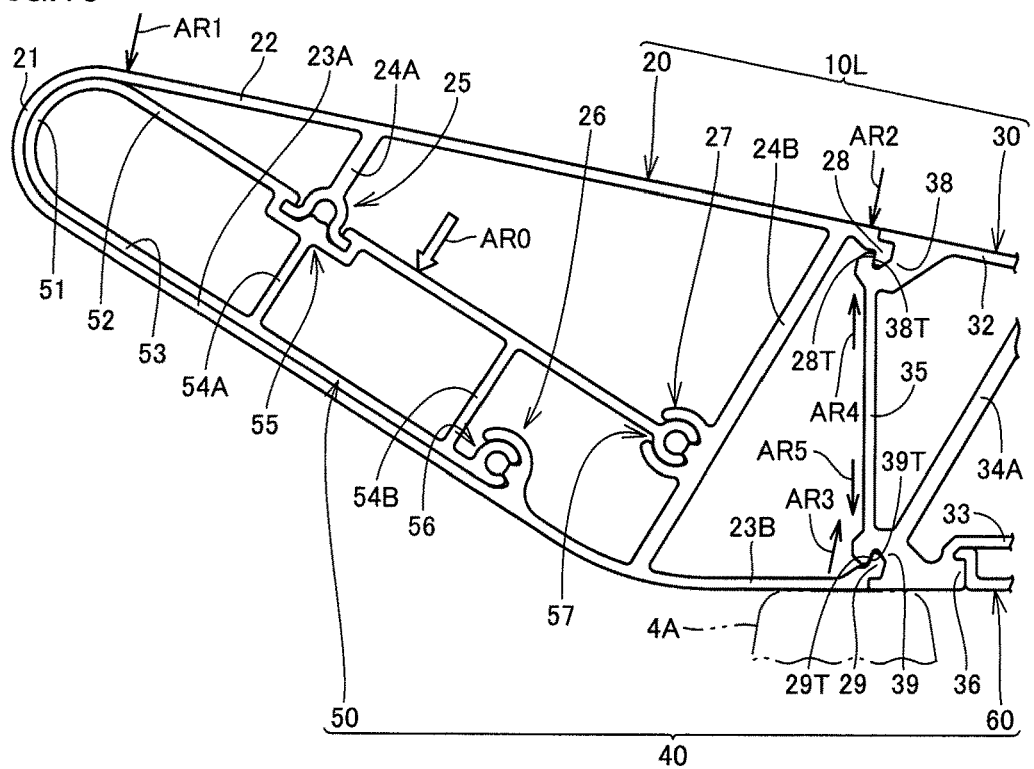
FIG. 13 is a side view illustrating a function and effect of vehicle seat 1 in an embodiment.

FIG. 13 is a side view illustrating a function and effect of vehicle seat 1 in the embodiment. As described above, under normal conditions, seat cushion 3 (FIG. 1) is fixed in the state of the seating position where it is collapsed on base 4 (cushion rubber 4A), and held in the state that allows the seated passenger to sit on the upper side of seat cushion 3. Assume that a load as indicated by an arrow AR0 in FIG. 13 acts on upper surface portion 52 of front panel portion 50 in this state. This load also acts on a portion of front frame portion 20 coupled to front panel portion 50 that is close to front end portion 21 as indicated by an arrow AR1, and also acts on a portion of front frame portion 20 that is close to rear upper fitting portion 28 as indicated by an arrow AR2. The entire upper flat plate portion 22 is biased such that it is displaced in a direction identical to the direction indicated by arrow AR0 (that is, obliquely downward and forward).

In the present embodiment, rear upper fitting portion 28 has a protruding shape extending downward from above, and front upper fitting portion 38 has an upwardly opening recessed shape. Even if front upper fitting portion 38 receives the load as indicated by arrow AR2 from rear upper fitting portion 28, front upper fitting portion 38 can oppose the load by virtue of having the upwardly opening recessed shape, thereby suppressing the release of the fitting between rear upper fitting portion 28 and front upper fitting portion 38.

Furthermore, in the present embodiment, rear upper fitting portion 28 is provided with rear upper inclined surface 28T extending obliquely downward and forward, and front upper fitting portion 38 is provided with front upper inclined surface 38T extending obliquely upward and rearward, with rear upper inclined surface 28T and front upper inclined surface 38T being locked to each other. This locked structure can oppose the displacement of rear upper fitting portion 28 in the direction indicated by arrow AR2 (that is, obliquely downward and forward) and the forward displacement of rear upper fitting portion 28, thereby further suppressing the release of the fitting between rear upper fitting portion 28 and front upper fitting portion 38.

A portion of front frame portion 20 on the cushion rubber 4A side (rear end side) has relatively high structural rigidity and therefore functions as a fixed end, while a portion of front frame portion 20 on the front end portion 21 side has lower structural rigidity than the fixed end and therefore acts as a free end, so that front frame portion 20 is generally supported in a cantilever manner as a whole. Accordingly, when a load as indicated by arrow AR1 acts on a portion of front frame portion 20 close to front end portion 21, the load acts as an upward load as indicated by an arrow AR3 at a position in the vicinity of rear lower fitting portion 29.

In the present embodiment, rear lower fitting portion 29 has a protruding shape extending upward from below, and front lower fitting portion 39 has a downwardly opening recessed shape. Even if front lower fitting portion 39 receives the load as indicated by arrow AR3 from rear lower fitting portion 29, front lower fitting portion 39 can oppose the load by virtue of having the downwardly opening recessed shape, thereby suppressing the release of the fitting between rear lower fitting portion 29 and front lower fitting portion 39.

Furthermore, in the present embodiment, rear lower fitting portion 29 is provided with rear lower inclined surface 29T extending obliquely upward and rearward, and front lower fitting portion 39 is provided with front lower inclined surface 39T extending obliquely downward and forward, with rear lower inclined surface 29T and front lower inclined surface 39T being locked to each other. This locked structure can oppose the displacement of rear lower fitting portion 29 in the direction indicated by arrow AR3 (that is, obliquely upward and rearward) and the forward displacement of rear lower fitting portion 29, thereby further suppressing the release of the fitting between rear lower fitting portion 29 and front lower fitting portion 39.

In the present embodiment, support rib 35 connecting front upper fitting portion 38 and front lower fitting portion 39 is provided at a portion of rear frame portion 30 between front upper fitting portion 38 and front lower fitting portion 39. The relative movement between front upper fitting portion 38 and front lower fitting portion 39 is regulated by the presence of support rib 35. Support rib 35 opposes (arrow AR4) biasing of rear upper fitting portion 28 and front upper fitting portion 38 such that they are displaced in the direction indicated by arrow AR2 (that is, downward), and also opposes (arrow AR5) biasing of rear lower fitting portion 29 and front lower fitting portion 39 such that they are displaced in the direction indicated by arrow AR3 (that is, upward). Accordingly, the release of the fitting between rear upper fitting portion 28 and front upper fitting portion 38 can be effectively suppressed, and the release of the fitting between rear lower fitting portion 29 and front lower fitting portion 39 can also be effectively suppressed.

In the present embodiment, front panel portion 50 forming part of cushion panel 40 and rear panel portion 60 forming part of cushion panel 40 are formed by being cut from an extrusion material made of an aluminum alloy or a magnesium alloy having a constant cross-sectional shape in the direction orthogonal to the width direction. It is possible not only to readily fabricate front panel portion 50 and rear panel portion 60 having these configurations, but also to readily implement the application of each configuration described above to them. Front panel portion 50 and rear panel portion 60 may be integrally configured, and the entire cushion panel 40 may be fabricated as a single member by being cut from an extrusion material made of an aluminum alloy or a magnesium alloy having a constant cross-sectional shape in the direction orthogonal to the width direction.

In the present embodiment, front frame portion 20 forming part of side frame 10L and rear frame portion 30 forming part of side frame 10L are formed by being cut from an extrusion material made of an aluminum alloy or a magnesium alloy having a constant cross-sectional shape in the direction orthogonal to the width direction. This is also the case with side frame 10R, and side frame 10L and side frame 10R can utilize front frame portions 20 having the same configuration and rear frame portions 30 having the same configuration. It is possible not only to readily fabricate front frame portion 20 and rear frame portion 30 having these configurations, but also to readily implement the application of each configuration described above to them. Front frame portion 20 and rear frame portion 30 may be integrally configured, and the entire side frame 10L may be fabricated as a single member by being cut from an extrusion material made of an aluminum alloy or a magnesium alloy having a constant cross-sectional shape in the direction orthogonal to the width direction. This is also the case with side frame 10R.

[Variation of Embodiment]

Figure 14:
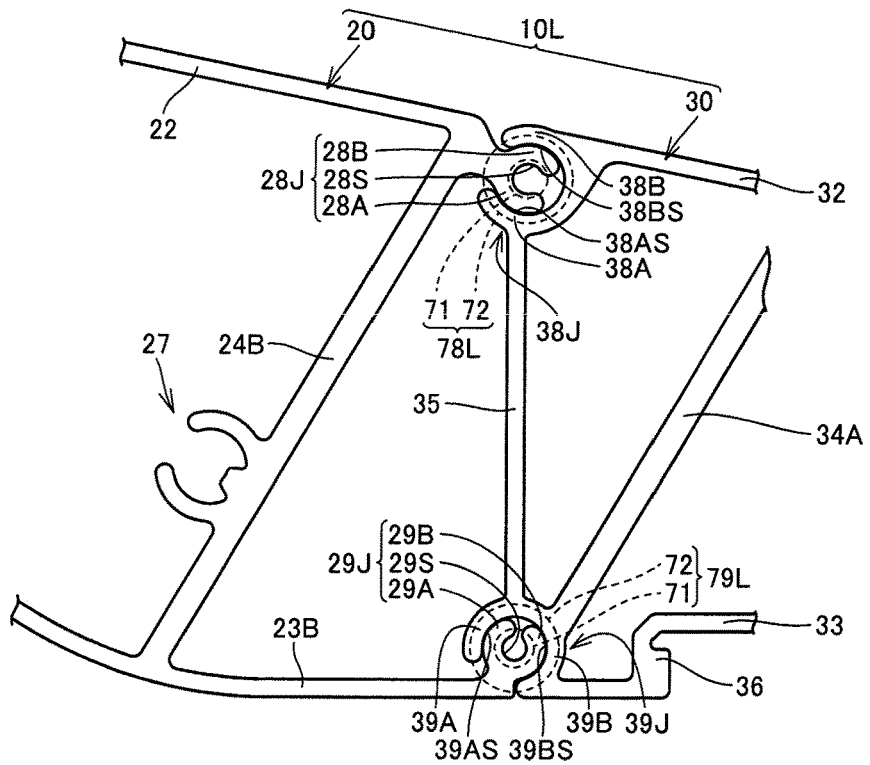
FIG. 14 is a side view regarding a vehicle seat in a variation of the embodiment, which shows front frame portion 20 and rear frame portion 30 provided on side frame 10L in an assembled state in this variation.

FIG. 14 is a side view regarding a vehicle seat in a variation of the embodiment, which shows front frame portion 20 and rear frame portion 30 provided on side frame 10L in an assembled state in this variation. Vehicle seat 1 in the embodiment (FIG. 1) and the vehicle seat in the present variation are different on the following point.

The vehicle seat in the present variation has screws 78L and 79L as insertion members for fixing front frame portion 20 and rear frame portion 30 together. Screw 78L as an insertion member includes shank 71 and head 72, and screw 79L as an insertion member also includes shank 71 and head 72.

(Rear Upper Fitting Portion 28J, Front Upper Fitting Portion 38J, and Screw 78L)

The rear end of upper flat plate portion 22 of front frame portion 20 is provided with a rear upper fitting portion 28J (which also functions as an elastically deformed portion). Rear upper fitting portion 28J includes curved portions 28A and 28B extending in the width direction. Curved portions 28A and 28B face each other, and extend such that each describes a semi-circular arc rearward from the rear end of upper flat plate portion 22. An inner circumferential surface 28S of rear upper fitting portion 28J has a surface shape which is substantially C-shaped.

The front end of upper flat plate portion 32 of rear frame portion 30 is provided with a front upper fitting portion 38J (which also functions as a recess forming portion). Front upper fitting portion 38J includes curved portions 38A and 38B extending in the width direction. Curved portions 38A and 38B face each other, and extend such that each describes a semi-circular arc forward from the front end of upper flat plate portion 32. Curved portions 38A and 38B of front upper fitting portion 38J include inner surfaces 38AS and 38BS, respectively.

Front frame portion 20 and rear frame portion 30 are assembled together while making slide-contact with each other in the width direction, such that rear upper fitting portion 28J is located on the inner side of front upper fitting portion 38J. In the assembled state, inner surfaces 38AS and 38BS of front upper fitting portion 38J face an outer circumferential surface of rear upper fitting portion 28J (curved portions 28A and 28B). A substantially cylindrical space is formed on the inner side of inner circumferential surface 28S of rear upper fitting portion 28J. Shank 71 has a diameter larger than this space, and is press fitted into this space from the outer side in the width direction.

The insertion of shank 71 on the inner side of inner circumferential surface 28S causes the outer circumferential surface of rear upper fitting portion 28J (curved portions 28A and 28B) to be expanded outward, and the outer circumferential surface of rear upper fitting portion 28J expanded by the insertion of shank 71 is brought into pressure contact with inner surfaces 38AS and 38BS of front upper fitting portion 38J. In this state, head 72 of screw 78L is provided on the outer side of shank 71 in the width direction, and can make contact with both rear upper fitting portion 28J and front upper fitting portion 38J from the outer side in the width direction, thereby defining relative positions of rear upper fitting portion 28J and front upper fitting portion 38J in the width direction. That is, an end face of head 72 on the shank 71 side can be pressed against both an outer end face of rear upper fitting portion 28J and an outer end face of front upper fitting portion 38J, thereby allowing these outer end faces to be aligned flush with each other.

(Rear Lower Fitting Portion 29J, Front Lower Fitting Portion 39J, and Screw 79L)

The rear end of lower flat plate portion 23B of front frame portion 20 is provided with a rear lower fitting portion 29J (which also functions as an elastically deformed portion). Rear lower fitting portion 29J includes curved portions 29A and 29B extending in the width direction. Curved portions 29A and 29B face each other, and extend such that each describes a semi-circular arc obliquely upward and rearward from the rear end of lower flat plate portion 23B. An inner circumferential surface 29S of rear lower fitting portion 29J has a surface shape which is substantially C-shaped.

The front side of front end fitting portion 36 of rear frame portion 30 is provided with a front lower fitting portion 39J (which also functions as a recess forming portion). Front lower fitting portion 39J includes curved portions 39A and 39B extending in the width direction. Curved portions 39A and 39B face each other, and extend such that each describes a semi-circular arc obliquely downward and forward from the front side of front end fitting portion 36. Curved portions 39A and 39B of front lower fitting portion 39J include inner surfaces 39AS and 39BS, respectively.

Front frame portion 20 and rear frame portion 30 are assembled together while making slide-contact with each other in the width direction, such that rear lower fitting portion 29J is located on the inner side of front lower fitting portion 39J. In the assembled state, inner surfaces 39AS and 39BS of front lower fitting portion 39J face an outer circumferential surface of rear lower fitting portion 29J (curved portions 29A and 29B). A substantially cylindrical space is formed on the inner side of inner circumferential surface 29S of rear lower fitting portion 29J. Shank 71 has a diameter larger than this space, and is press fitted into this space from the outer side in the width direction.

The insertion of shank 71 on the inner side of inner circumferential surface 29S causes the outer circumferential surface of rear lower fitting portion 29J (curved portions 29A and 29B) to be expanded outward, and the outer circumferential surface of rear lower fitting portion 29J expanded by the insertion of shank 71 is brought into pressure contact with inner surfaces 39AS and 39BS of front lower fitting portion 39J. In this state, head 72 of screw 79L is provided on the outer side of shank 71 in the width direction, and can make contact with both rear lower fitting portion 29J and front lower fitting portion 39J from the outer side in the width direction, thereby defining relative positions of rear lower fitting portion 29J and front lower fitting portion 39J in the width direction. That is, an end face of head 72 on the shank 71 side can be pressed against both an outer end face of rear lower fitting portion 29J and an outer end face of front lower fitting portion 39J, thereby allowing these outer end faces to be aligned flush with each other.

In the present variation, front frame portion 20 and rear frame portion 30 are fixed together using a fastening structure including screws 78L and 79L (FIG. 3) as insertion members, rear upper fitting portion 28J and rear lower fitting portion 29J as elastically deformed portions, and front upper fitting portion 38J and front lower fitting portion 39J as recess forming portions. These front frame portion 20 and rear frame portion 30 constituting the framework of the vehicle seat can be joined together without using a welding process. As such, manufacturing costs which do not involve the costs for welding equipment and a welding process can be reduced. According to the present variation, manufacturing costs can be reduced for a similar reason even in comparison to an example where they are joined using rivets and the like.

The above contents of the present disclosure could be summarized as follows.

A vehicle seat based on one aspect of the present disclosure includes: first and second side frames arranged at a distance from each other in a width direction; a cushion panel arranged between the first and second side frames; and an insertion member for fixing the cushion panel to the first side frame, one of the side frame and the cushion panel being provided with an elastically deformed portion, the elastically deformed portion being formed to extend in the width direction and including an outer circumferential surface and an inner circumferential surface, the outer circumferential surface being configured to be expanded outward by insertion of the insertion member on the inner side of the inner circumferential surface, the other of the first side frame and the cushion panel not provided with the elastically deformed portion being provided with a recess forming portion, the recess forming portion being formed to extend in the width direction and facing the outer circumferential surface of the elastically deformed portion, the recess forming portion having an inner surface configured to be brought into pressure contact with the outer circumferential surface expanded by insertion of the insertion member.

According to the vehicle seat described above, the first side frame and the cushion panel are fixed together using a fastening structure including the insertion member, the elastically deformed portion, and the recess forming portion. The first side frame and cushion panel constituting the framework of the vehicle seat can be joined together without using a welding process. As such, manufacturing costs which do not involve the costs for welding equipment and a welding process can be reduced. According to the vehicle seat described above, manufacturing costs can be reduced for a similar reason even in comparison to an example where they are joined using rivets and the like.

In the vehicle seat described above, the insertion member may include a shank inserted on the inner side the inner circumferential surface, and a head provided on the outer side of the shank in the width direction, and making contact with both the elastically deformed portion and the recess forming portion from the outer side in the width direction so as to define relative positions of the elastically deformed portion and the recess forming portion in the width direction.

According to the vehicle seat described above, the head of the insertion member can be utilized to allow an outer end face of the first side frame and an outer end face of the cushion panel in the width direction to be readily aligned flush with each other.

In the vehicle seat described above, the cushion panel may include an upper surface portion provided with a first recess forming portion, the other of the first side frame and the cushion panel may be provided with a plurality of the recess forming portions including a first recess forming portion and a second recess forming portion, the first recess forming portion being provided at the upper surface portion and extending in the width direction, the second recess forming portion being provided at the upper surface portion and extending in the width direction, and the first recess forming portion and the second recess forming portion being formed to face each other in a front to rear direction, and the elastically deformed portion may include a first piece portion arranged on the inner side of the first recess forming portion, and a second piece portion arranged on the inner side of the second recess forming portion and configured to be displaced such that a distance between the first piece portion and the second piece portion increases by the insertion of the insertion member.

According to the vehicle seat described above, both forward and rearward movements of the cushion panel relative to the first side frame can be effectively regulated.

In the vehicle seat described above, the cushion panel may include a front panel portion and a rear panel portion configured as mutually separate members, and the elastically deformed portion may be provided at a rear end of the front panel portion.

According to the vehicle seat described above, forward separation of the cushion panel from the first side frame can be suppressed.

A vehicle seat based on another aspect of the present disclosure includes: a pair of side frames arranged at a distance from each other in a width direction and each including a front frame portion and a rear frame portion; a cushion panel arranged between the pair of side frames; and an insertion member for fixing the front frame portion and the rear frame portion together, one of the front frame portion and the rear frame portion being provided with an elastically deformed portion, the elastically deformed portion being formed to extend in the width direction and including an outer circumferential surface and an inner circumferential surface, the outer circumferential surface being configured to be expanded outward by insertion of the insertion member on the inner side of the inner circumferential surface, the other of the front frame portion and the rear frame portion being provided with a recess forming portion, the recess forming portion being formed to extend in the width direction and facing the outer circumferential surface of the elastically deformed portion, the recess forming portion having an inner surface configured to be brought into pressure contact with the outer circumferential surface expanded by insertion of the insertion member.

According to the vehicle seat described above, the front frame portion and the rear frame portion are fixed together using a fastening structure including the insertion member, the elastically deformed portion, and the recess forming portion. These front frame portion and rear frame portion constituting the framework of the vehicle seat can be joined together without using a welding process. As such, manufacturing costs which do not involve the costs for welding equipment and a welding process can be reduced. According to the vehicle seat described above, manufacturing costs can be reduced for a similar reason even in comparison to an example where they are joined using rivets and the like.

In the vehicle seat described above, a part or a whole of the cushion panel may be formed by being cut from an extrusion material made of an aluminum alloy or a magnesium alloy having a constant cross-sectional shape in a direction orthogonal to the width direction.

According to the vehicle seat described above, it is possible not only to readily fabricate a part or a whole of the cushion panel, but also to readily implement the application of each configuration described above.

In the vehicle seat described above, a part or a whole of the first side frame may be formed by being cut from an extrusion material made of an aluminum alloy or a magnesium alloy having a constant cross-sectional shape in a direction orthogonal to the width direction.

According to the vehicle seat described above, it is possible not only to readily fabricate a part or a whole of the first side frame, but also to readily implement the application of each configuration described above.

In the vehicle seat described above, a part or a whole of the pair of side frames may be formed by being cut from an extrusion material made of an aluminum alloy or a magnesium alloy having a constant cross-sectional shape in a direction orthogonal to the width direction.

According to the vehicle seat described above, it is possible not only to readily fabricate a part or a whole of the pair of side frames, but also to readily implement the application of each configuration described above.

Although the embodiments of the present disclosure have been described, it should be understood that the embodiments disclosed herein are illustrative and non-restrictive in every respect. The scope of the present invention is defined by the terms of the claims, and is intended to include any modifications within the meaning and scope equivalent to the terms of the claims.

What is claimed is:

1. A vehicle seat comprising:
   first and second side frames arranged at a distance from each other in a width direction;
   a cushion panel arranged between the first and second side frames; and
   an insertion member for fixing the cushion panel to the first side frame,
   one of the first side frame and the cushion panel being provided with an elastically deformed portion, the elastically deformed portion being formed to extend in the width direction and including an outer circumferential surface and an inner circumferential surface, the outer circumferential surface being configured to be expanded outward by insertion of the insertion member on an inner side of the inner circumferential surface,
   the other of the first side frame and the cushion panel being provided with a recess forming portion, the recess forming portion being formed to extend in the width direction and facing the outer circumferential surface of the elastically deformed portion, the recess forming portion having an inner surface configured to receive the elastically deformed portion and to be brought into pressure contact with the outer circumferential surface expanded by the insertion of the insertion member.

2. The vehicle seat according to claim 1, wherein the insertion member includes
   a shank inserted on the inner side of the inner circumferential surface, and
   a head provided on an outer side of the shank in the width direction, and making contact with both the elastically deformed portion and the recess forming portion from the outer side in the width direction so as to define relative positions of the elastically deformed portion and the recess forming portion in the width direction.

3. The vehicle seat according to claim 1, wherein the cushion panel includes an upper surface portion,
the other of the first side frame and the cushion panel is provided with a plurality of the recess forming portions including a first recess forming portion and a second recess forming portion, the first recess forming portion being provided at the upper surface portion and extending in the width direction, the second recess forming portion being provided at the upper surface portion and extending in the width direction, and the first recess forming portion and the second recess forming portion being formed to face each other in a front to rear direction, and
the elastically deformed portion includes a first piece portion arranged on an inner side of the first recess forming portion, and a second piece portion arranged on an inner side of the second recess forming portion and configured to be displaced such that a distance between the first piece portion and the second piece portion increases by the insertion of the insertion member.

4. The vehicle seat according to claim 1, wherein the cushion panel includes a front panel portion and a rear panel portion configured as mutually separate members, and
the elastically deformed portion is provided at a rear end of the front panel portion.

5. A vehicle seat comprising:
a pair of side frames arranged at a distance from each other in a width direction and each including a front frame portion and a rear frame portion;
a cushion panel arranged between the pair of side frames; and
an insertion member for fixing the front frame portion and the rear frame portion together,
one of the front frame portion and the rear frame portion being provided with an elastically deformed portion, the elastically deformed portion being formed to extend in the width direction and including an outer circumferential surface and an inner circumferential surface, the outer circumferential surface being configured to be expanded outward by insertion of the insertion member on an inner side of the inner circumferential surface,
the other of the front frame portion and the rear frame portion being provided with a recess forming portion, the recess forming portion being formed to extend in the width direction and facing the outer circumferential surface of the elastically deformed portion, the recess forming portion having an inner surface configured to receive the elastically deformed portion and to be brought into pressure contact with the outer circumferential surface expanded by insertion of the insertion member.

6. The vehicle seat according to claim 5, wherein
a part or a whole of the cushion panel is formed by being cut from an extrusion material made of an aluminum alloy or a magnesium alloy having a constant cross-sectional shape in a direction orthogonal to the width direction.

7. The vehicle seat according to claim 5, wherein
a part or a whole of the pair of side frames is formed by being cut from an extrusion material made of an aluminum alloy or a magnesium alloy having a constant cross-sectional shape in a direction orthogonal to the width direction.

8. The vehicle seat according to claim 1, wherein
a part or a whole of the cushion panel is formed by being cut from an extrusion material made of an aluminum alloy or a magnesium alloy having a constant cross-sectional shape in a direction orthogonal to the width direction.

9. The vehicle seat according to claim 1, wherein
a part or a whole of the first side frames is formed by being cut from an extrusion material made of an aluminum alloy or a magnesium alloy having a constant cross-sectional shape in a direction orthogonal to the width direction.

* * * * *